(12) United States Patent
Miyamoto (10) Patent No.: US 11,241,916 B2
(45) Date of Patent: Feb. 8, 2022

(54) PNEUMATIC TIRE

(71) Applicant: Toyo Tire Corporation, Itami (JP)

(72) Inventor: Takeshi Miyamoto, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 157 days.

(21) Appl. No.: 16/597,328

(22) Filed: Oct. 9, 2019

(65) Prior Publication Data

US 2020/0130418 A1    Apr. 30, 2020

(30) Foreign Application Priority Data

Oct. 25, 2018 (JP) .............................. JP2018-201042

(51) Int. Cl.
*B60C 11/03* (2006.01)
*B60C 11/00* (2006.01)
*B60C 11/13* (2006.01)

(52) U.S. Cl.
CPC ...... *B60C 11/0302* (2013.01); *B60C 11/0008* (2013.01); *B60C 11/1369* (2013.01)

(58) Field of Classification Search
CPC ............. B60C 11/0304; B60C 11/1369; B60C 11/0302; B60C 11/1353
See application file for complete search history.

(56) References Cited

U.S. PATENT DOCUMENTS

| | | |
|---|---|---|
| 2012/0241061 A1 | 9/2012 | Maehara |
| 2013/0020001 A1 | 1/2013 | Nishi |
| 2014/0069561 A1 * | 3/2014 | Dermience ......... B60C 11/0058 152/209.18 |
| 2017/0297379 A1 * | 10/2017 | Higashiura ......... B60C 11/0302 |
| 2018/0297417 A1 * | 10/2018 | Higashiura ......... B60C 11/0302 |

FOREIGN PATENT DOCUMENTS

| | | | | |
|---|---|---|---|---|
| CA | 3111316 A1 * | 4/2020 | ......... | B60C 11/0302 |
| CN | 102689568 A | 9/2012 | | |
| JP | 2011-143896 A | 7/2011 | | |
| JP | 2013-32068 A | 2/2013 | | |
| JP | 2013032068 A * | 2/2013 | | |
| JP | 2013-147171 A | 8/2013 | | |

(Continued)

OTHER PUBLICATIONS

Office Action dated Jul. 21, 2021, issued in counterpart CN application No. 201910888794.2, with English translation. (18 pages).

(Continued)

*Primary Examiner* — Timothy Kennedy
*Assistant Examiner* — Farah Taufiq
(74) *Attorney, Agent, or Firm* — Westerman, Hattori, Daniels & Adrian, LLP (57) ABSTRACT

A plurality of main grooves extending from a tread center region including a tire equator to ground contact ends so as to be inclined with respect to a tire width direction are provided on a tread section at intervals in a tire circumferential direction. Sub-grooves extending in a direction crossing the tire width direction with a narrower groove width than the main grooves in the tread center region are provided. Tie bars connecting blocks separated by the sub-grooves are provided inside the sub-grooves.

6 Claims, 8 Drawing Sheets

(56) References Cited

FOREIGN PATENT DOCUMENTS

| | | |
|---|---|---|
| JP | 2016-74328 A | 5/2016 |
| JP | 2016-159857 A | 9/2016 |

OTHER PUBLICATIONS

"Finite element analysis of tire contact patch under static and rolling conditions", China Elastomerics, 2008, vol. 18, No. 6, pp. 13-14, with partial English translation, cited in CN Office Action dated Jul. 21, 2021. (4 pages).

Office Action dated Dec. 13, 2021, issued in counterpart CN application No. 201910888794.2, with English translation. (17 pages).

\* cited by examiner

PNEUMATIC TIRE

CROSS-REFERENCE TO RELATED APPLICATIONS

This application is based upon and claims the benefit of priority from the prior Japanese Patent Application No. 2018-201042, filed on Oct. 25, 2018; the entire contents of which are incorporated herein by reference.

BACKGROUND

1. Field of the Invention

An embodiment of the present invention relates to a pneumatic tire.

2. Description of Related Art

There is known in related art a pneumatic tire provided with grooves such as main grooves and sub-grooves on a tread section to form land sections such as blocks as well as raised parts called tie bars in the grooves to connect blocks by the tie bars (refer to JP-A-2013-032068, JP-A-2016-159857, JP-A-2013-147171 and JP-A-2011-143896).

There is also known a pneumatic tire provided with a plurality of main grooves extending from a tread center region toward ground contact ends so as to be inclined with respect to a tire width direction at intervals in a tire circumferential direction and sub-grooves extending in a direction crossing the tire width direction so as to connect with the main grooves (refer to JP-A-2016-074328).

In the tire provided with the main grooves extending so as to be inclined as described above, so-called contraction inside a ground contact surface tends to occur in the case where the sub-grooves extending in the direction crossing the tire width direction are provided in the tread center region. The contraction inside the ground contact surface is a phenomenon in which the tread center region is floated and tread shoulder regions on both sides thereof are deformed so as to be displaced to a tire equator side when the tire contacts the ground. When the contraction inside the ground contact surface occurs, a ground contact pressure is reduced in the tread center region and distribution of ground contact pressures becomes nonuniform, which may impair operation stability. In a case where a groove width of the sub-grooves is narrowed, there is a danger that the sub-grooves are closed due to the contraction inside the ground contact surface and a drainage property is impaired.

SUMMARY

An object of an embodiment of the present invention is to provide a pneumatic tire capable of uniforming the distribution of ground contact pressures and improving the drainage property.

A pneumatic tire according to an embodiment of the present invention includes main grooves provided at intervals in a tire circumferential direction on a tread section and extending from a tread center region including a tire equator to ground contact ends so as to be inclined with respect to a tire width direction, sub-grooves extending in a direction crossing the tire width direction with a narrower groove width than the main grooves in the tread center region; and tie bars provided inside the sub-grooves and connecting blocks separated by the sub-grooves.

According to the embodiment, it is possible to uniform distribution of ground contact pressures and to improve the drainage property by suppressing contraction inside the ground contact surface.

DESCRIPTION OF EMBODIMENTS

Hereinafter, embodiments will be explained with reference to the drawings.

A pneumatic tire (hereinafter may be referred to as merely a tire) according to an embodiment includes a left and right pair of bead sections, a left and right pair of side wall sections and a tread section provided between both side wall sections so as to connect a radial-direction outer end portions of the right and left side wall sections, which can adopt a common tire structure except for a tread pattern.

The tire according to the embodiment is a tire in which a rotation direction is designated, and the rotation direction (namely, a front side in the rotation direction) is denoted by a symbol RF in the drawings. The tire is fitted to a vehicle so that the tire rotates in the direction shown by an arrow RF when the vehicle travels forward. As a marker for that, an indication for designating the rotation direction is provided on, for example, the sidewall section. A rear side in the rotation direction is a direction opposite to the rotation direction RF, which is shown by an arrow RR.

In the drawing, a symbol CL denotes a tire equator corresponding to the center in a tire width direction. A symbol WD denotes the tire width direction (namely, a direction parallel to a tire rotation axis). A symbol WO denotes an outer side in the tire width direction (namely, a direction going away from the tire equator CL in the tire width direction WD) and a symbol WI denotes an inner side in the tire width direction (namely, a direction coming close to the tire equator CL). A symbol CD denotes a tire circumferential direction (direction on a circumference centered at the tire rotation axis).

Respective dimensions in the specification are in a normal state with no load in which the tire is fitted to a normal rim and is filled with a normal internal pressure. The normal rim will be a "standard rim" in JATMA standard, "Design Rim" in TRA standard or "Measuring Rim" in ETRTO standard. The normal internal pressure will be "the maximum air pressure" in JATMA standard, "the maximum value" written in "TIRE LOAD LIMITS AT VARIOUS COLD INFLATION PRESSURES" in TRA standard, or "INFLATION PRESSURE" in ETRTO standard.

In the drawing, a symbol E denotes a ground contact end. The ground contact end E is an outermost position in the tire width direction WD) on the ground contact surface. The ground contact surface indicates a surface of the tread section contacting a road surface when the tire is put on a flat road vertically and a normal load is added in a state where the tire is rim-assembled to the normal rim and filled with the normal internal pressure. The normal load is a load designated according to each tire by each standard in a standard system including a standard to which the tire belongs, which will be the maximum load capacity in JATMA, the maximum value written in the above table in TRA and "LOAD CAPACITY" in ETRTO, however, a load corresponding to 88% of the above loads in a case where the tire is for a passenger car.

First Embodiment

Figure 1:
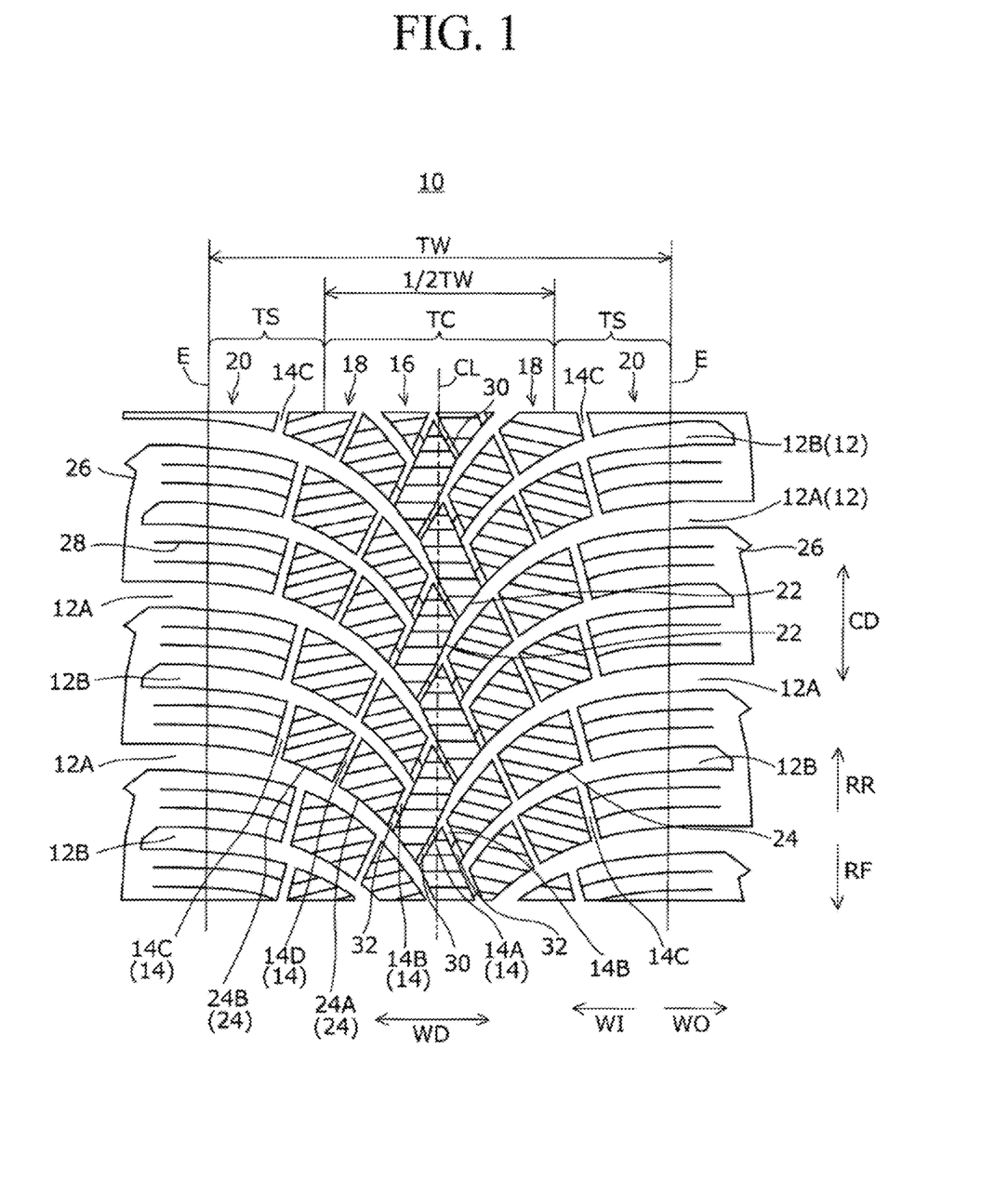
FIG. 1 is a development view showing a tread pattern of a pneumatic tire according to a first embodiment.

FIG. 1 is a development view showing a tread section 10 of a pneumatic tire according to a first embodiment. On a tread rubber surface of the tread section 10, a plurality of main grooves 12 are provided at intervals (fixed intervals in this example) in the tire circumferential direction CD.

The main grooves 12 extend so as to be inclined with respect to the tire width direction WD from a tread center region TC including the tire equator CL to the ground contact ends E. The main grooves 12 are provided at intervals in the tire circumferential direction CD on both sides of the tire equator CL respectively. The main grooves 12 extend from places close to the tire equator CL in the tread center region TC (specifically, side surfaces of a later-described center land section 16) to the rear side RR of the rotation direction so as to extend over the ground contact ends E. The main grooves 12 extend while curving so that an angle with respect to the tire width direction WD is gradually reduced to be smaller on the ground contact end E side than the tire equator CL side. The main grooves 12 include first main grooves 12A separating later-described shoulder blocks 26 and second main grooves 12B extending over the ground contact ends E and terminated inside the shoulder blocks 26. The first main grooves 12A and the second main grooves 12B are provided alternately in the tire circumferential direction CD. The first main grooves 12A and the second main grooves 12B are provided so that the first main groove 12A on one side in the tire width direction WD and the second main groove 12B on the other side are in symmetrical positions with respect to the tire equator CL.

Here, the tread center region TC corresponds to a range of 50% of a ground contact width TW centered at the tire equator CL in the tread section 10. Ranges to the ground contact ends E on both sides in the tire width direction WD of the tread center region TC (respective ranges of 25% of the ground contact width TW) are tread shoulder ranges TS. The ground contact width TW is a distance between ground contact ends E, E on both sides.

A plurality of sub-grooves 14 each having a narrower groove width than the main groove 12 are provided in the tread section 10. A plurality of land sections and blocks are formed to be demarcated on the tread section 10 by these main grooves 12 and the sub-grooves 14. In this example, a plurality of first sub-grooves 14A, second sub-grooves 14B, third sub-grooves 14C and fourth sub-grooves 14D are respectively provided as the sub-grooves 14.

Figure 3:
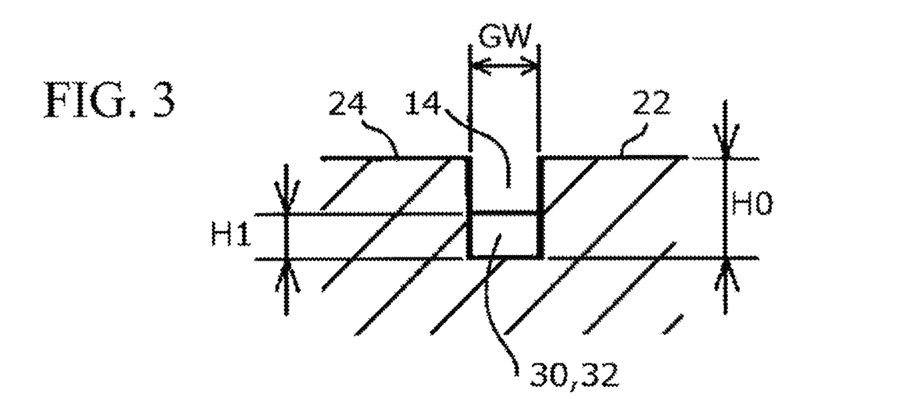
FIG. 3 is a cross-sectional view taken along M-IM line of FIG. 2.

Here, the groove width GW of the sub-groove 14 (see FIG. 3) is not particularly limited as far as the width is narrower than the groove width of the main groove 12, which is preferably 2 mm or more and 4% or less of the ground contact width TW, move preferably, 2 to 4 mm, and may be smaller than 4 mm. The groove width of the main groove 12 is not particularly limited, which is preferably 4 mm or more, more preferably, larger than 5 mm.

The center land section 16 is provided on the tire equator CL in the tread center region TC. The center land section 16 is a land section positioned in the center of the tire width direction WD. The center land section 16 is separated from mediate land sections 18 on outer sides in the tire width direction WO by end portions of the first main grooves 12A on the tire equator CL side and the second sub-grooves 14B. The mediate land sections 18 are separated from a shoulder land sections 20 on the outer sides in the tire width direction WO by the third sub-grooves 14C provided on the tread shoulder land sections TS.

The center land section 16 is formed as a block row in which a plurality of center blocks 22 are aligned in the tire circumferential direction CD by the first sub-grooves 14A. The plurality of first sub-grooves 14A are grooves traversing the center land section 16, which are provided in the center land section 16 at intervals in the circumferential direction CD. Accordingly, the center land section 16 is partitioned into plural center blocks 22.

Figure 2:
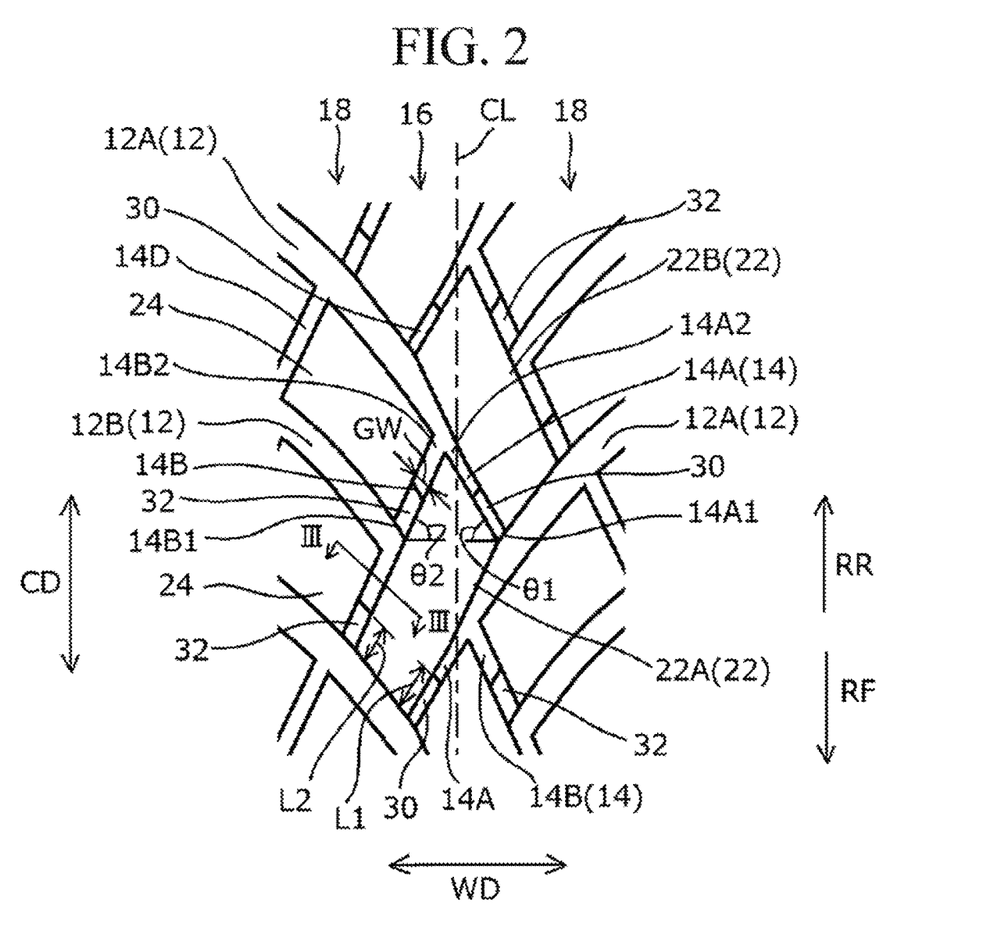
FIG. 2 is an enlarged view of a relevant part of the tread pattern.

Specifically, the center land section 16 is formed by providing the first sub-grooves 14A at respective sides of the land section extending in a zigzag shape in the tire circumferential direction CD. That is, the center land section 16 includes quadrangular first center blocks 22A extending so as to be inclined to one side in the tire width direction WD toward one side in the tire circumferential direction CD and quadrangular second center blocks 22B extending so as to be inclined to the other side in the tire width direction WD toward one side in the tire circumferential direction CD as shown in FIG. 2. The center land section 16 extends in the zigzag shape in the tire circumferential direction CD by arranging the first center blocks 22A and the second center blocks 22B alternately in the tire circumferential direction CD. The center land section 16 is formed so that one side surface of any of the first center block 22A and the second center block 22B abuts on an end surface of the other through the first sub-groove 14A.

The first sub-groove 14A is the sub-groove 14 extending in a direction crossing the tire width direction WD and crossing the main groove 12 in the tread center region TC. In this example, the first sub-groove 14A is provided so that one end 14A1 thereof crosses the first main groove 12A on one side in the tire width direction WD in a T-shape and the other end 14A2 is connected from an end of the first main groove 12A on the other side in the tire width direction WD to an extended line thereof as shown in FIG. 2 in an enlarged manner. The first sub-groove 14A is inclined with respect to the tire width direction WD as well as also inclined with respect to the tire circumferential direction CD. An inclined angle θ1 of the first sub-groove 14A with respect to the tire width direction WD is not particularly limited, and for example, θ1 may be 30 degrees to 80 degrees. In this example, the first sub-groove 14A is provided at a position where part thereof crosses the tire equator CL.

The mediate land section 18 is formed between the second sub-groove 14B and the third sub-groove 14C, which is partitioned by the first main grooves 12A and the second main grooves 12B in the tire circumferential direction CD. Accordingly, the mediate land section 18 is formed as a block row in which a plurality of mediate blocks 24 are aligned in the tire circumferential direction CD. In this example, the mediate land section 18 is formed so that end surfaces (side surfaces facing the tire equator side) of two mediate blocks 24, 24 adjacent in the tire circumferential direction CD face a side surface of one center block 22 as shown in FIG. 2. Also, the mediate block 24 is partitioned into a first mediate block 24A on the inner side in the tire width direction WI and a second mediate block 24B on the outer side in the tire width direction WO by the fourth sub-groove 14D arranged between the second sub-groove 14B and the third sub-groove 14C as shown in FIG. 1.

The second sub-groove 14B is the sub-groove 14 extending in a direction crossing the tire width direction WD as well as crossing the main groove 12 in the tread center region TC. Specifically, the second sub-groove 14B is the sub-groove 14 separating the center block 22 and the mediate block 24 arranged between the first main groove 12A and the second main groove 12B on the outer side in the tire width direction WO of the center block 22.

As shown in FIG. 2 in the enlarged manner, the second sub-groove 14 is formed so that one end 14B1 thereof crosses an inner end in the tire width direction of the second main groove 12B and the other end 14B2 crosses the first main groove 12A. The second sub-groove 14B is inclined with respect to the tire width direction WD as well as also inclined with respect to the tire circumferential direction CD. An inclined angle θ2 of the second sub-groove 14B with respect to the tire width direction WD is not particularly limited, and may be, for example, θ2 may be 30 degrees to 80 degrees.

The fourth sub-groove 14D is provided at an approximately intermediate position between the second sub-groove 14B and the third sub-groove 14C, which is provided in approximately parallel to the second sub-groove 14B. Therefore, the fourth sub-groove 14D is inclined with respect to the tire width direction WD as well as inclined also with respect to the tire circumferential direction CD in the same manner as the second sub-groove 14B.

The shoulder land section 20 is formed on the outer side in the tire width direction WO of the third sub-grooves 14C, which is partitioned by the first main grooves 12A in the tire circumferential direction CD. Accordingly, the shoulder land section 20 is formed as a block row in which a plurality of shoulder blocks 26 are aligned in the tire circumferential direction CD. The third sub-groove 14C is the sub-groove 14 separating the mediate block 24 and the shoulder block 26 on the outer side in the tire width direction WO.

As shown in FIG. 1, sipes 28 formed by a plurality of cuts extending in the tire width direction WD are provided in respective blocks 22, 24 and 26 on the tread section 10. In FIG. 2, the sipes are not shown. Here, the sipe is a cut with a groove width of 1 mm or less, which is distinguished from the sub-groove.

In the tire having the above tread pattern, tie bars 30 and 32 connecting blocks separated (namely, divided) by these respective sub-grooves 14A and 14B are provided in the first sub-grooves 14A and the second sub-grooves 14B in the embodiment. The tie bars 30 and 32 are raised parts connecting between blocks on both sides by raising groove bottoms of the sub-grooves 14A and 14B. A height H1 of the tie bars 30 and 32 is preferably smaller than a depth H0 of the sub-grooves 14, and more preferably, 10 to 70% of the depth H0 of the sub-grooves 14A and 14B (see FIG. 3).

Specifically, a first tie bar 30 connecting the center blocks 22 and 22 is provided as the tie bar inside the first sub-groove 14A separating the center blocks 22 and 22 as shown in FIG. 2. Also, a second tie bar 32 connecting the center block 22 and the mediate block 24 is provided inside the second sub-groove 14B separating the blocks 22 and 24 as shown in FIG. 2.

A length L1 of the first tie bar 30 is set to be larger than a length L2 of the second tie bar 32 (L1>L2). Here, the lengths L1 and L2 of the tie bars 30 and 32 are dimensions or sizes of the tie bars 30 and 32 extending along a length direction of the sub-groove 14.

The lengths L1 and L2 of the tie bars 30 and 32 are preferably shorter than the length of the sub-groove 14 (in detail, a length of a side surface of the block forming a groove wall of the sub-groove 14), more preferably, 20 to 60% of the length of the sub-groove 14, however, the present invention is not limited to this. As the height H1, the lengths L1 and L2 of the tie bars 30 and 32 are set as described above, a balance between the drainage property and reinforcement can be further improved.

The tie bars 30 and 32 are arranged close to the front side RF in the rotation direction (namely, a treading side at the time of rotation) between respective blocks (namely, inside the sub-groove 14 separating blocks). Specifically, the tie bar 30 is arranged to be biased to the front side RF inside the first sub-groove 14A so that a center of the tie bar 30 in a length direction is positioned closer to the front side RF in the rotation direction than a center of the first sub-groove 14A in the length direction. The tie bar 32 is arranged to be biased to the front side RF inside the second sub-groove 14B so that a center of the tie bar 32 in a length direction is positioned to the front side RF in the rotation direction than a center of the second sub-groove 14B in the length direction.

According to the embodiment configured as described above, the tie bars 30 and 32 are provided in the sub-grooves 14 inclined with respect to the tire width direction WD positioned in the tread center region TC, thereby improving rigidity in the tire width direction WD. Accordingly, contraction inside the ground contact surface in which the tread center region TC is deformed to be floated when the tire contacts the ground can be suppressed. Therefore, it is possible to uniform the distribution of ground contact pressures and improve operation stability. Moreover, as the tie bars 30 and 32 are provided in the sub-grooves 14 with a narrow groove width GW, it is possible to suppress the sub-groove 14 being closed due to the contraction inside the ground contact surface. Therefore, the drainage property can be improved and wet performance such as braking performance on a wet road surface can be improved.

Furthermore, the tie bars 30 and 32 are provided in the first sub-groove 14A and the second sub-groove 14B closer to the tire equator CL in the tread center region TC. As the contraction inside the ground contact surface occurs at a place around the tire equator CL as a starting point, the contraction inside the ground contact surface can be effectively suppressed by providing the tie bars 30 and 32 in the sub-grooves 14A and 14B closer to the tire equator CL. Note that similar tie bars may be provided in the third sub-groove 14C and the fourth sub-groove 14D.

The length L1 of the first tie bar 30 provided in the first sub-groove 14A separating the center blocks 22 and 22 is formed to be larger than the length L2 of the second tie bar 32 provided in the second sub-groove 14B separating the center block 22 and the mediate block 24. Accordingly, a place close to the tire equator CL to be the starting point of the contraction inside the ground contact surface can be reinforced more effectively, and the effect of suppressing the contraction inside the ground contact surface can be further increased. In terms of the above, it is preferable that the length of the tie bar is set to be longer as coming closer to the tire equator CL.

As the tie bars 30 and 32 are arranged so as to be close to the front side RF in the rotation direction in respective sub-grooves 14, deformation of the blocks 22 and 24 at the time of tire braking can be suppressed more effectively. That is, a force is applied to end portions on the front side RF in the rotation direction of respective blocks 22 and 24, namely, the treading side at the time of tire braking. Accordingly, the tie bars 30 and 32 are arranged so as to be close to the treading side, thereby effectively suppressing deformation of the blocks 22 and 24, and improving the braking performance.

Second Embodiment

Figure 4:
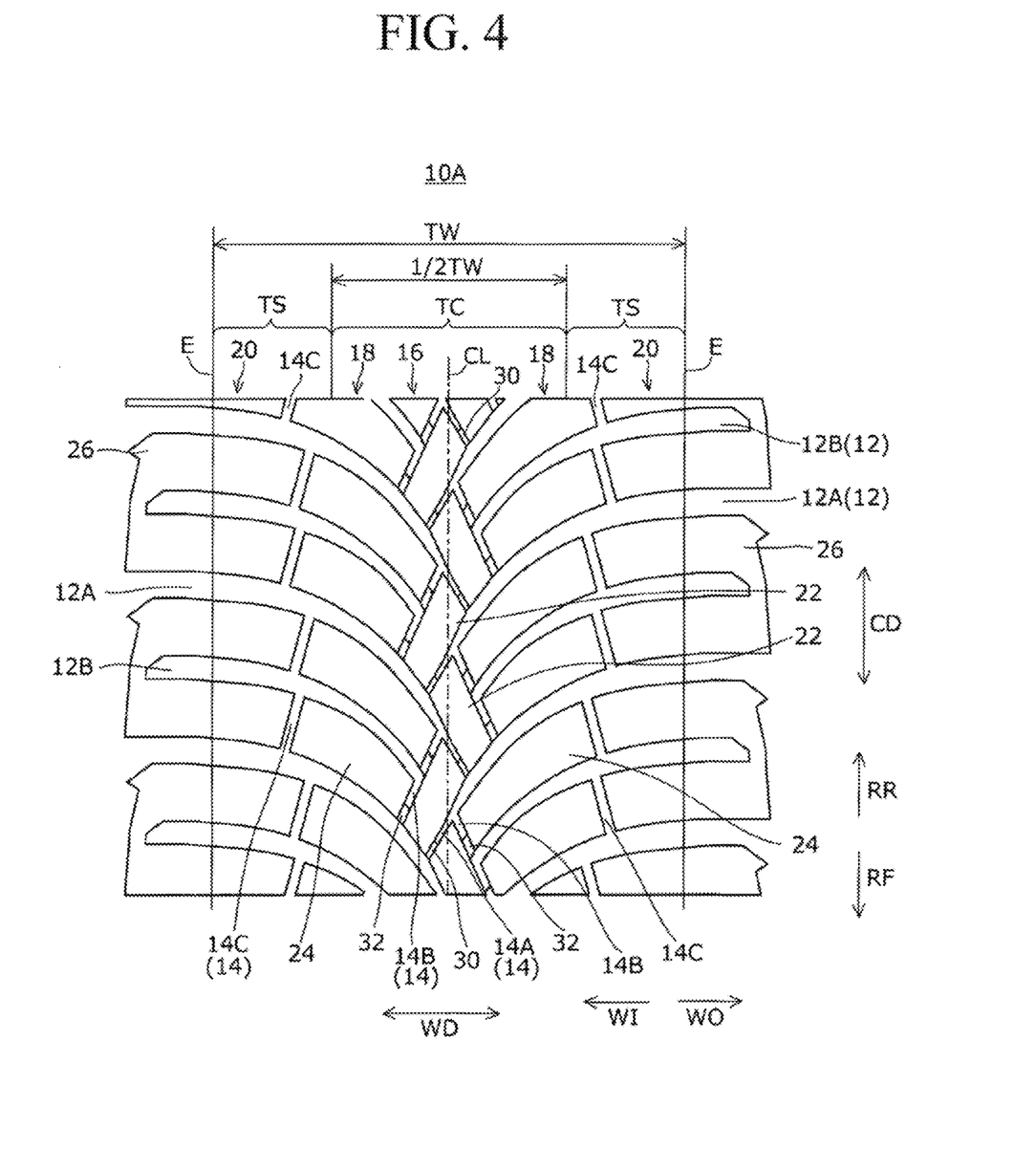
FIG. 4 is a development view showing a tread pattern of a pneumatic tire according to a second embodiment.

FIG. 4 is a development view showing a tread section 10A of a tire according to a second embodiment. Though sipes are not shown in FIG. 4, sipes similar to FIG. 1 may be provided.

The tread section 10A according to the second embodiment differs from the tread section 10 according to the first embodiment in a point that the fourth sub-groove 14D is not provided. That is, the mediate block 24 is not partitioned into the first mediate block 24A and the second mediate block 24B, and the mediate block 24 is formed in the entire width of the medicate land section 18 in the second embodiment. Other structures and operational effects of the second embodiment are the same as those of the first embodiment, and explanation is omitted.

Third Embodiment

Figure 5:
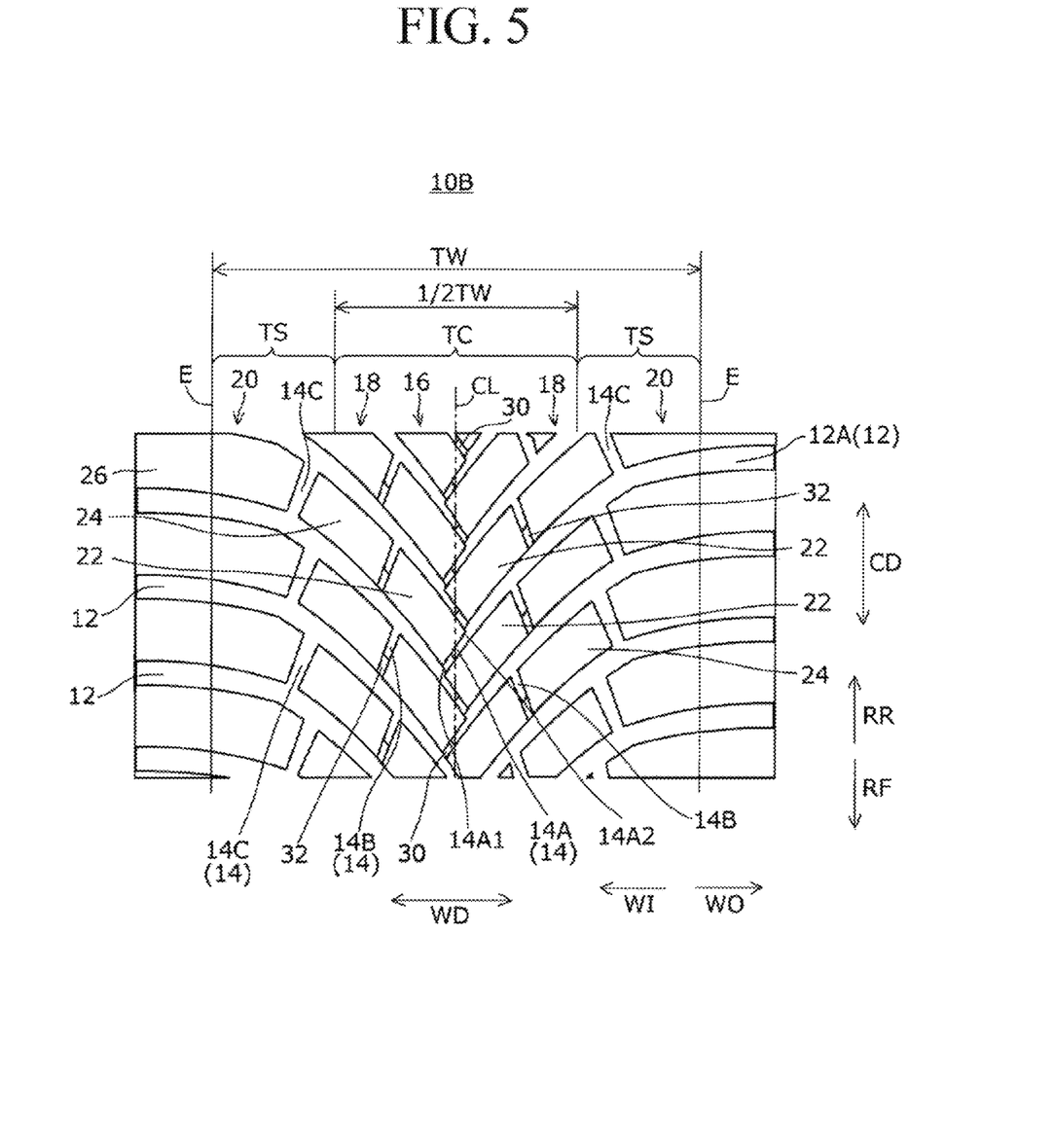
FIG. 5 is a development view showing a tread pattern of a pneumatic tire according to a third embodiment.

FIG. 5 is a development view of a tread section 10B according to a third embodiment. Though sipes are not shown in FIG. 5, sipes similar to FIG. 1 may be provided.

The tread section 10B according to the third embodiment differs from the tread section 10 according to the first embodiment in the structure of the center land section 16. The tread section 10B also differs from the first embodiment also in a point that the second main grooves 12B terminating inside the shoulder blocks 26 are not provided as the main grooves 12 and only the first main grooves 12A opening to the outer sides in the tire width direction WO are provided.

Specifically, in the third embodiment, main grooves 12 extending from places close to the tire equator CL toward the ground contact ends E so as to be inclined are provided at intervals in the tire circumferential direction CD, and land sections formed between the main grooves 12, 12 adjacent to each other in the tire circumferential direction CD are partitioned by the second sub-grooves 14B and the third sub-grooves 14C. Accordingly, center blocks 22, mediate blocks 24 and shoulder blocks 26 extending along an extending direction of the main grooves 12 are formed. Then, inner-side end portions in the tire width direction of the center blocks 22 on one side with respect to the tire equator CL and inner-side end portions in the tire width direction of the center blocks 22 on the other side alternately cross each other with respect to the tire equator CL. The inner-side end portions of the center blocks 22 on one side and the inner-side end portions of the center blocks 22 on the other side are separated by the first sub-grooves 14A with a narrower groove width than the main grooves 12.

The first sub-groove 14A is provided so that one end 14A1 thereof crosses the first main groove 12 on one side in the tire width direction WD in a T-shape and the other end 14A2 is connected from an end of the main groove 12 on the other side in the tire width direction WD to an extended line thereof in this example.

Then, tie bars 30 and 32 similar to those in the first embodiment are respectively provided in the first sub-grooves 14A separating the center blocks 22 and 22 and the second sub-grooves 14B separating the center blocks 22 and the mediate blocks 24.

As described above, the sub-grooves 14 in which the tie bars 30 and 32 are provided can be applied to various sub-grooves as far as the sub-grooves extend in the direction crossing the tire width direction WD in the tread center region TC. Other structures and operational effects of the third embodiment are the same as those of the first embodiment, and explanation is omitted.

Fourth Embodiment

Figure 6:
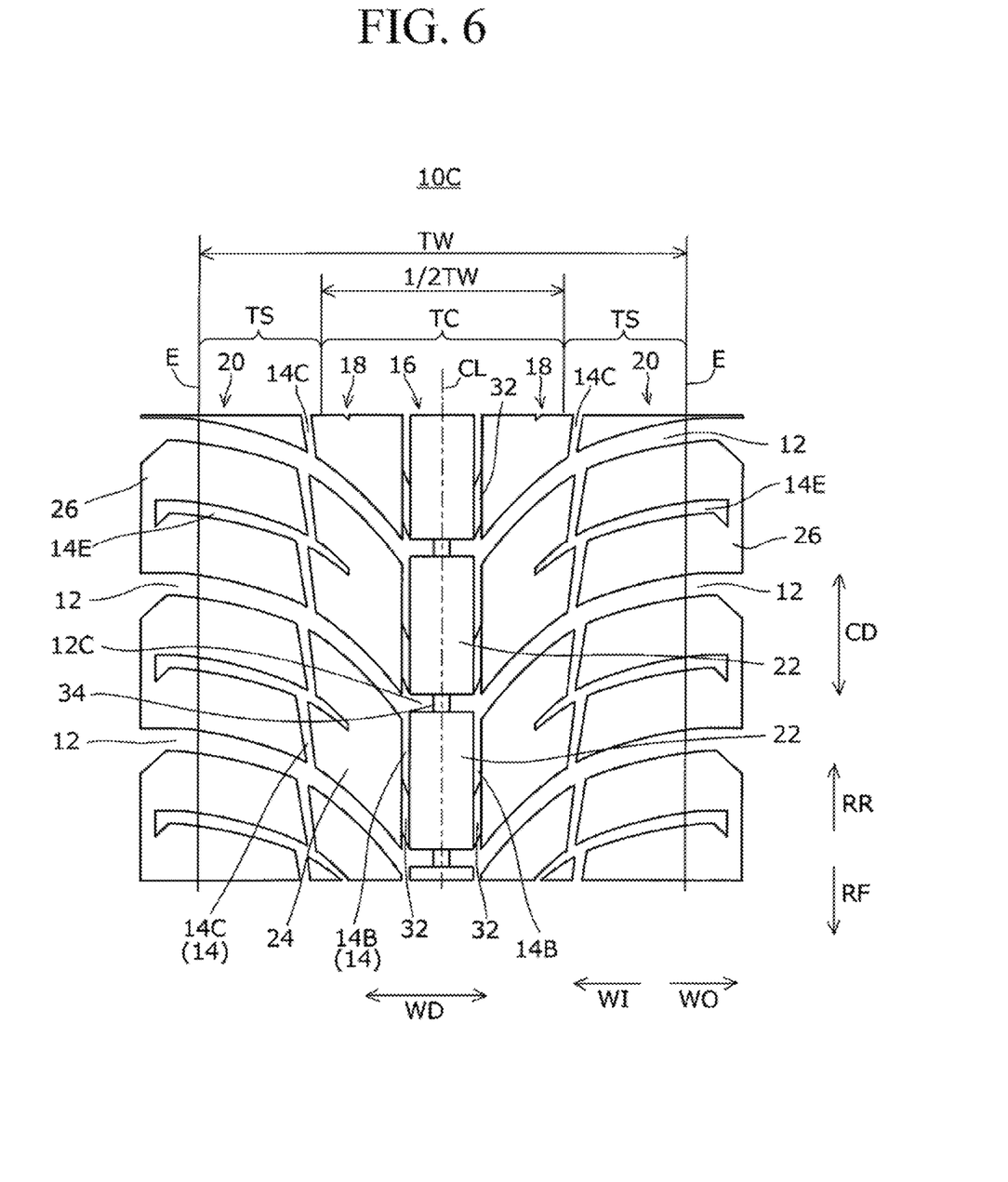
FIG. 6 is a development view showing a tread pattern of a pneumatic tire according to a fourth embodiment.

FIG. 6 is a development view of a tread section 10C according to a fourth embodiment. Though sipes are not shown in FIG. 6, sipes similar to FIG. 1 may be provided.

In the tread section 10C according to the fourth embodiment, the main grooves 12 provided at intervals in the tire circumferential direction CD are provided so as to be symmetrical with respect to the tire equator CL. Left and right main grooves 12 and 12 are connected by a connecting main groove portion 12C connecting respective ends of the main grooves. The connecting main groove portions 12C extend in parallel to the tire width direction WD, which partition the center land section 16 provided in the tread center region TC into a plurality of center blocks 22.

The second sub-grooves 14B separating the center blocks 22 and the mediate blocks 24 extend in parallel to the tire circumferential direction CD in this example. In the shoulder blocks 26, fifth sub-grooves 14E are provided along the extending direction of the main grooves 12. In the fifth sub-groove 14E, one end thereof opens to the third-sub groove 14C separating the mediate block 24 and the shoulder block 26 and enters the mediate block 24 to be terminated inside the mediate block 24, and the other end thereof is terminated inside the shoulder block 26.

In the fourth embodiment, tie bars 32 connecting between the center blocks 22 and the mediate blocks 24 are provided inside the second sub-grooves 14B. The second sub-groove 14B is the sub-groove 14 extending in a direction crossing the tire width direction WD and crossing the main groove 12 in the tread center region TC. Specifically, the second sub-groove 14B is the sub-groove 14 separating the center block 22 and the mediate block 24 arranged between the main grooves 12 and 12 on the outer side in the tire width direction WO of the center block 22. The tie bars 32 are arranged close to the front side RF in the rotation direction inside the second sub-grooves 14B in the same manner as the first embodiment.

Also inside the connecting main groove portions 12C connecting between left and right main grooves 12 and 12, tie bars 34 connecting the center blocks 22 and 22 on both sides thereof are provided in this example.

As described above, the sub-groove 14 in which the tie bar 32 is provided may extend in parallel to the tire circumferential direction CD as far as the tie bar extends in the direction crossing the tire width direction WD in the tread center region TC. Other structures and operational effects of the fourth embodiment are the same as those of the first embodiment, and explanation is omitted.

Fifth Embodiment

Figure 7:
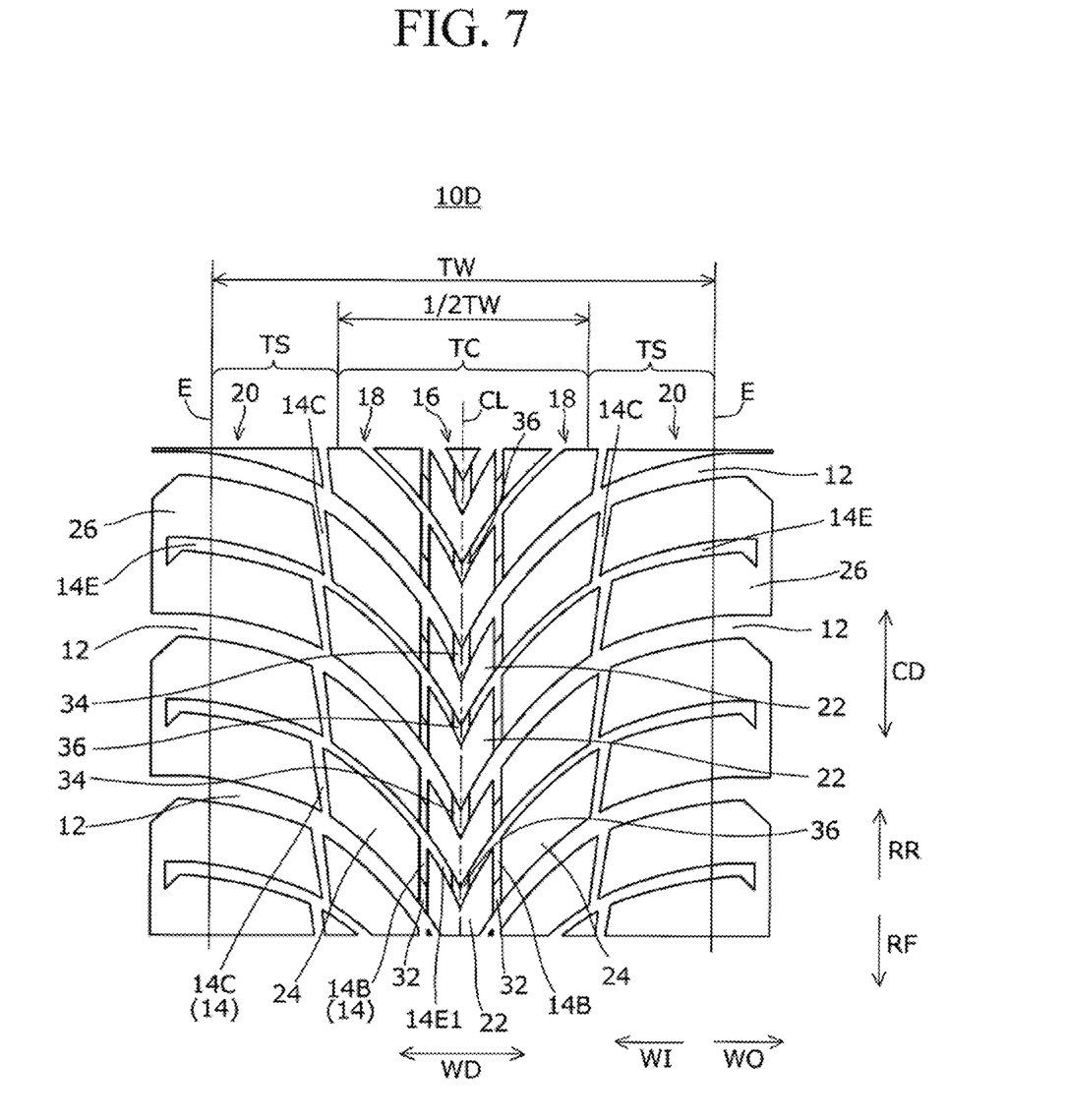
FIG. 7 is a development view showing a tread pattern of a pneumatic tire according to a fifth embodiment.

FIG. 7 is a development view of a tread section 10D according to a fifth embodiment. Though sipes are not shown in FIG. 7, sipes similar to FIG. 1 may be provided.

In the tread section 10D according to the fifth embodiment, the fifth sub-grooves 14E in the fourth embodiment are extended to the tire equator CL, thereby dividing the center blocks 22 and the mediate blocks 24 into two, respectively, which differs from the fourth embodiment in this point. Also, inner-side ends in the tire width direction of left and right main grooves 12 and 12 are extended to reach the tire equator CL, thereby connecting the main grooves 12 and 12 in a V-shape, which differs from the fourth embodiment in which the main grooves 12 and 12 are connected through the connecting main groove portions 12C in this point.

In the fifth embodiment, tie bars 32 connecting the blocks 22 and 24 are provided in the second sub-grooves 14B separating the center blocks 22 and the mediate blocks 24 in the same manner as the fourth embodiment.

In the fifth embodiment, the fifth sub-grooves 14E have V-shaped sub-groove portions 14E1 on the tire equator CL. The sub-groove portion 14E1 is the sub-groove extending in the direction crossing the tire width direction WD with a narrower groove width than the main groove 12 in the tread center region TC. Tie bars 36 connecting the center blocks 22 and 22 are provided inside the sub-groove portions 14E1.

The tie bars 36 are arranged close to the front side RF in the rotation direction inside the V-shaped sub-groove portions 14E1. That is, the tie bar 36 is provided at an apex of the V-shape of the sub-groove portions 14E1.

Other structures and operational effects of the fifth embodiment are the same as those of the fourth embodiment, and explanation is omitted.

Other Embodiments

The tie bars 30 and 32 having the shape in which the groove bottom is simply raised are adopted in the above embodiments. However, when a lightening shape is adopted as the shape of the tie bars 30 and 32, weight can be reduced. That is, a shape with, for example, a high second moment of area (that is, a shape not easily deformed with respect to the bending moment) is adopted, thereby improving reinforcement by tie bars while reducing the weight.

Figure 8A:
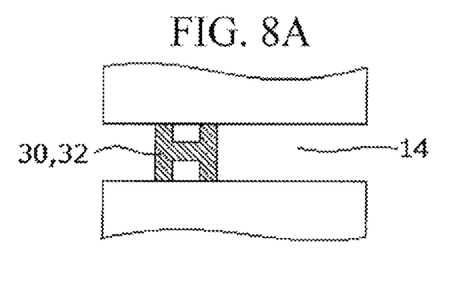
FIGS. 8A to 8G are plan views showing modification examples of tie bars.
Figure 8B:
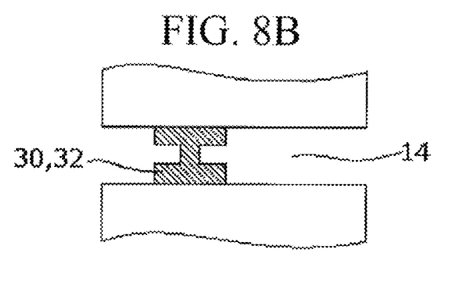
Figure 8C:
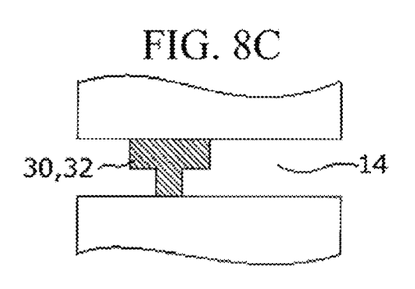
Figure 8D:
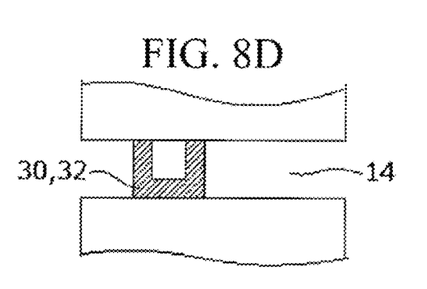
Figure 8E:
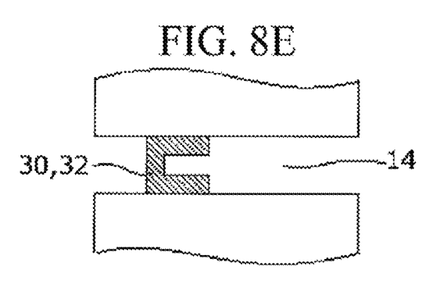
Figure 8F:
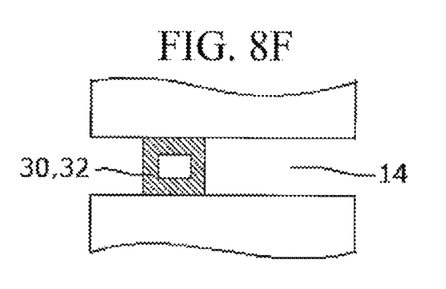
Figure 8G:
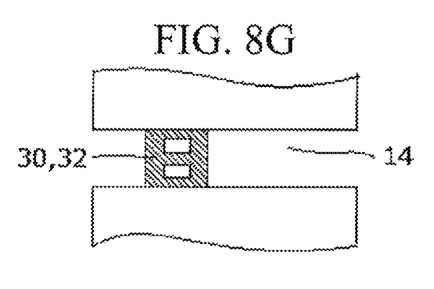

As such shapes, an H-shape in plan view shown in FIG. 8A, an I-shape in plan view shown in FIG. 8B, a T-shape in plan view shown in FIG. 8C, a U-shape in plan view shown in FIG. 8D, a C-shape in plan view shown in FIG. 8E, a square-frame shape in plan view shown in FIG. 8F, a 8-shape in plan view shown in FIG. 8G and so on can be cited. In FIGS. 8A to 8G places corresponding to tie bars are shaded for making planar shapes of the tie bars 30 and 32 easy to understand.

The tie bars 30 and 32 may be formed of rubber that is integral with tread rubber for forming the main grooves and the sub-grooves, however, rubber with a higher hardness than the tread rubber may be used, thereby improving reinforcement due to the tie bars 30 and 32 while reducing the weight. For example, the tie bars 30 and 32 may be formed of rubber having a hardness 1.1 times or more of the tread rubber (corresponds to cap rubber on the tread surface side when the tread rubber is formed by a two-layer structure including base rubber and cap rubber). Here, the hardness of rubber is 3.2 durometer hardness in JIS K6253-1-2012, which is measured in an atmosphere of 23° C. by using a durometer type A for general rubber (middle hardness).

Moreover, in a tire mold for molding the tread section 10, an arc in a cross section in the tire width direction of the tread surface in the tread center region TC is not particularly limited, but a radius of curvature R is preferably 700 to 1200 mm. When the radius of curvature R is 700 mm or more, it is possible to suppress reduction of rigidity in the tread surface and to increase the effect of suppressing the contraction inside the ground contact surface. When the radius of curvature R is 1200 mm or less, it is possible to suppress a ground contact shape being too square and to suppress deterioration in distribution of ground contact pressures.

As the pneumatic tire according to the embodiments, tires for various types of vehicles, for example, a tire for a passenger car and tires for a heavy load such as for a truck, a bus and light trucks (for example, a SUV vehicle and a pickup truck) can be cited. The pneumatic tire is preferably used for the tire for the passenger car, and winter tires such as a snow tire and a studless tire.

Examples

Examples and comparative examples were obtained concerning a pneumatic tire for a passenger car with a tire size: 225/50R17. A tire of Example 1 corresponds to the tire according to the first embodiment. A tire of Comparative Example 1 corresponds to an example in which the tie bars 30 and 32 are omitted in Example 1. The height H1 of the tie bars 30 and 32 was set to 4 mm (the depth H0 of the sub-grooves 14 was set to 9 mm).

Figure 9:
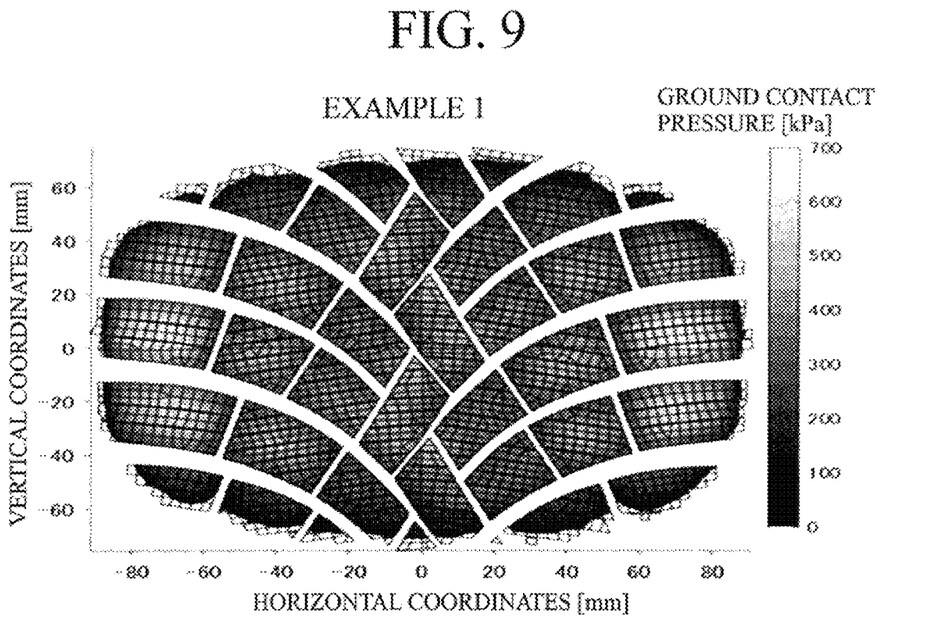
FIG. 9 is a graph showing dispersion in ground contact pressures of a pneumatic tire according to Example 1.
Figure 10:
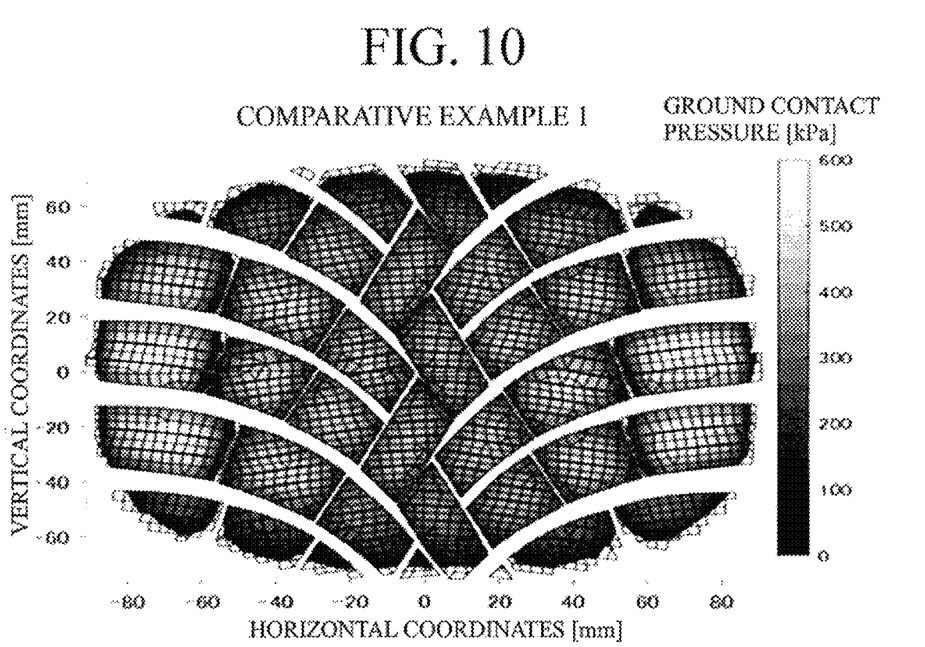
FIG. 10 is a graph showing dispersion in ground contact pressures of a pneumatic tire according to Comparative Example 1.

The distribution of ground contact pressures concerning tires of Example 1 and Comparative Example 1 are as shown in FIG. 9 and FIG. 10. In Comparative Example 1 shown in FIG. 10, the difference in ground contact pressures between the shoulder region and the center region was large, there were places where the sub-grooves were closed in the center region and the contraction inside the ground contact surface was seen. On the other hand, in Example 1 shown in FIG. 9, the difference in ground contact pressures between the shoulder region and the center region was reduced to be lower than that of Comparative Example 1, and the contraction inside the ground contact surface was suppressed. There were few places where the sub-grooves were closed, and a groove (void) area was 4% increased as compared with Comparative Example 1.

Concerning tires of Example 1 and Comparative Example 1, the operation stability, the wet performance and the drainage property were evaluated. An evaluation method is as follows.

Operation stability: Prototype tires were fitted to rims of 17×7, being filled with an internal pressure 220 kPa and fitted to prototype vehicles, then, two test drivers started, turned and braked the vehicles on a test course and sensory evaluation was comprehensively performed to be shown by indexes using Comparative Example as 100. The larger the index is, the better the operation stability is.

Wet performance: Prototype tires were fitted to the rims of 17×7, being filled with the internal pressure 220 kPa. In real vehicle evaluation with one driver, braking distances were measured at the time of sudden braking on a wet road surface from 100 km/h to 0 km/h, and reciprocals of braking distances were shown by indexes using a value of Comparative Example 1 as 100. The larger the index is, the shorter the braking distance is, and the more excellent the wet performance is.

Drainage property: Prototype tires were fitted to the rims of 17×7, being filled with the internal pressure 220 kPa. In real vehicle evaluation with two drivers, the speed was increased by units of 10 km/h in a watercourse with a water depth of 10 mm, and speeds obtained until hydroplaning occurred were shown by indexes using a value of Comparative Example 1 as 100. The larger the index is, the more excellent the drainage property is.

TABLE 1

|  |  | Comparative Example 1 | Example 1 |
|---|---|---|---|
| Tie bar | between center blocks | absent | present |
|  | between center block and mediate block | absent | present |
| Evaluation item | operation stability | 100 | 105 |
|  | wet braking | 100 | 103 |
|  | drainage property | 100 | 106 |

Results are as shown in table 1, and all evaluations in the operation stability, the wet performance and the drainage property were excellent in Example 1 with the tie bars installed with respect to Comparative Example 1 without tie bars.

Some embodiments have been explained above, and these embodiment are cited as examples and do not intend to limit the scope of the invention. These embodiments may be achieved in other various manners, and various kinds of omission, replacement and alterations may occur within a scope not departing from the gist of the invention. These embodiments and modifications thereof are included in claims or the gist thereof as well as included in the inventions described in claims and the range of equivalency of the claims.

What is claimed is:

1. A pneumatic tire comprising:
   main grooves provided at intervals in a tire circumferential direction on a tread section and extending from a tread center region including a tire equator to ground contact ends so as to be inclined with respect to a tire width direction;
   sub-grooves extending in a direction crossing the tire width direction with a narrower groove width than the main grooves in the tread center region; and
   tie bars provided inside the sub-grooves, comprising raised parts that are raised from groove bottoms of the sub-grooves, each having a length that is 20 to 60% of a length of each of the sub-grooves, each having a height that is 10 to 70% of a depth of each of the sub-grooves, and connecting blocks separated by the sub-grooves,
   wherein the tread center region includes a center land section on the tire equator,
   the sub-grooves include first sub-grooves provided at intervals in the tire circumferential direction on the center land section to partition the center land section into a plurality of center blocks and second sub-grooves separating the center blocks and mediate blocks arranged between the main grooves adjacent in the tire circumferential direction on outer sides in the tire width direction of the center blocks,
   the tie bars include first tie bars provided in the first sub-grooves and connecting the center blocks and second tie bars provided in the second sub-grooves and connecting the center blocks and the mediate blocks, and
   a length of the first tie bars is larger than a length of the second tie bars.

2. The pneumatic tire according to claim 1,
   wherein the center land section comprises first center blocks extending so as to be inclined to one side in the tire width direction toward one side in the tire circumferential direction and second center blocks extending so as to be inclined to the other side in the tire width direction toward one side in the tire circumferential direction, and the center land section extends in a zigzag shape in the tire circumferential direction by arranging the first center blocks and the second center blocks alternately in the tire circumferential direction.

3. The pneumatic tire according to claim 1,
   wherein a rotation direction is designated, and
   the tie bars are arranged so as to be close to a front side in the rotation direction between respective blocks.

4. The pneumatic tire according to claim 1, wherein the tie bar has a lightening shape in which the raised parts comprise hollowed-out portions.

5. The pneumatic tire according to claim 4,
   wherein the lightening shape is an H-shape in plan view, an I-shape in plan view, a T-shape in plan view, a U-shape in plan view, a C-shape in plan view, a square-frame shape in plan view or a 8-shape in plan view.

6. The pneumatic tire according to claim 1,
   wherein rubber for forming the tie bars has a higher hardness than tread rubber.

* * * * *